(12) United States Patent
Kim et al.

(10) Patent No.: US 7,066,043 B2
(45) Date of Patent: Jun. 27, 2006

(54) DOUBLE CLUTCH TRANSMISSION

(75) Inventors: In Chan Kim, Yongin (KR); Tae Seok Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 170 days.

(21) Appl. No.: 10/911,723

(22) Filed: Aug. 4, 2004

(65) Prior Publication Data
US 2005/0115344 A1 Jun. 2, 2005

(30) Foreign Application Priority Data
Nov. 27, 2003 (KR) ............... 10-2003-0085145

(51) Int. Cl.
*F16H 3/08* (2006.01)
(52) U.S. Cl. .......................................... 74/330
(58) Field of Classification Search ............. 74/331, 74/330
See application file for complete search history.

(56) References Cited

U.S. PATENT DOCUMENTS 4,461,188 A * 7/1984 Fisher ........................ 74/330
4,738,149 A * 4/1988 Janiszewski ................ 74/330
6,638,197 B1 * 10/2003 Ogawa et al. .............. 477/174

FOREIGN PATENT DOCUMENTS

DE 19923185 A1 12/2000
DE 10316070 A1 10/2003

* cited by examiner

*Primary Examiner*—Dirk Wright
(74) *Attorney, Agent, or Firm*—Morgan Lewis & Bockius LLP

(57) ABSTRACT

A gear structure layout of a double clutch transmission includes a main input shaft for receiving an engine torque. A first and second input shaft rotating coaxially with the main input shaft. A first and second clutch, first and third drive gears formed on an input shaft, and second and fourth drive gears formed on the other input shaft. A first output device for selectively changing torques of the first, second, third, and fourth drive gears and for outputting the changed torque. A second output device for selectively changing torques of the first, second, third, and fourth drive gears and for outputting the changed torque. Also included is a differential gear commonly connected to the first output device and the second output device. The layout provides for only four drive gears on input shafts that enables a total of seven speeds, and a compact double clutch transmission.

10 Claims, 2 Drawing Sheets

DOUBLE CLUTCH TRANSMISSION

CROSS REFERENCE TO RELATED APPLICATIONS

This application claims priority of Korean Application No. 10-2003-0085147, filed on Nov. 27, 2003, the disclosure of which is incorporated herein by reference.

TECHNICAL FIELD OF THE INVENTION

Generally, the present invention relates to a double clutch transmission. More particularly, the double clutch transmission has a reduced length and enhanced power transmission efficiency.

BACKGROUND OF THE INVENTION

Typically, a double clutch transmission implies a transmission having two clutch devices. A double clutch transmission generally receives a torque input from an engine selectively at its two input shafts using two clutches. The double clutch transmission then changes the torque and speed using gears on the two input shafts and outputs torque and speed accordingly. Such a double clutch transmission has been devised basically to compactly provide multi-speed transmission of higher than five-speeds. The two clutches and synchronizing devices included in a double clutch transmission may be controlled by a controller, and accordingly, such a double clutch transmission may also realize an automated shift gear (ASG) that eliminates the necessity of manual shifting by a driver.

A typical clutch included in a double clutch transmission may be categorized as both dry- and wet-types based on its operational scheme. A dry-type clutch utilizes the same principle as a clutch device conventionally disposed between an engine and a manual transmission. A wet-type clutch utilizes the same principle as a clutch device inside a typical automatic transmission.

A wet-type clutch generally has a higher torque capacity than a dry-type clutch. Therefore, for an engine of high output power, the wet-type clutch is appropriate. For stable transmission of a high output torque of a high powered engine, widths of gears in the transmission should also be great. Therefore, a drawback of a double clutch transmission designed for a high torque engine is that the double clutch transmissions often become very lengthy.

[The information disclosed in this Background of the Invention section is only for enhancement of understanding of the background of the invention, and should not be taken as an acknowledgement or any form of suggestion that this information forms the prior art that is already known in this country to a person of ordinary skill in the art.]

SUMMARY OF THE INVENTION

An embodiment of the present invention includes a main input shaft for receiving an engine torque and a first input shaft rotating coaxially with the main input shaft. A second input shaft rotates coaxially with the main input shaft and along an exterior circumference of the first input shaft. First and second clutches are positioned for selectively transmitting torque of the main input shaft to the first and second input shafts. First and third drive gears are formed on one input shaft among the first and second input shafts, while second and fourth drive gears are formed on another input shaft among the first and second input shafts. The second input shaft differs from the first input shaft and a first output device is included that selectively changes torques of the first, second, third, and fourth drive gears and outputs the changed torque. A second output device for selectively changing torques of the first, second, third, and fourth drive gears is also included that outputs the changed torque. A differential gear is commonly connected to the first output device and the second output device.

In a further embodiment, the first output device includes a first output shaft disposed apart from the main input shaft by a predetermined distance. First, second, third, and fourth driven gears are disposed on the first output shaft and respectively engaged with the first, second, third, and fourth drive gears. A first synchronizing device is included for selectively transmitting one of the torques of the first and third driven gears to the first output shaft along with a second synchronizing device for selectively transmitting one of the torques of the second and fourth driven gears to the first output shaft. In this case it is preferable that the differential gear is connected to the first output shaft.

In a further embodiment, the second output device includes a second output shaft disposed apart from the main input shaft by a second predetermined distance. Fifth and sixth driven gears are disposed on the second output shaft and respectively engaged with the third and fourth drive gears. A first mediating gear engages with the first drive gear and a second mediating gear is connected to the first mediating gear by an idle shaft. A reverse driven gear is disposed between the fifth and sixth driven gears on the second output shaft and engages with the second mediating gear. A third synchronizing device is also included that selectively transmits a torque of the fifth driven gear to the second output shaft. A fourth synchronizing device selectively transmits one of the torques of the sixth and reverse driven gears to the second output shaft. It is preferred that the differential gear is connected to the second output shaft.

In a further embodiment, diameters of the first, second, third, and fourth drive gears increase in order of the first drive gear, the second drive gear, the third drive gear, and the fourth drive gear, respectively.

According to a further embodiment, the first, second, third, and fourth drive gears are disposed in sequence of the third drive gear, the first drive gear, the second drive gear, and the fourth drive gear.

In yet another embodiment, the first and third drive gears are formed on the first input shaft, and the second and fourth drive gears are formed on the second input shaft. According to a further embodiment, the first and third drive gears are disposed on the first input shaft such that the second input shaft is closer to the first drive gear than to the third drive gear.

In still a further embodiment, the second and fourth drive gears are disposed on the second input shaft such that the first input shaft is closer to the second drive gear than to the fourth drive gear.

BRIEF DESCRIPTION OF THE DRAWINGS

The accompanying drawings, which are incorporated in and constitute a part of the specification, illustrate an embodiment of the invention and read together with the description, serve to explain the principles of the invention in which.

DETAILED DESCRIPTION OF PREFERRED EMBODIMENTS

Figure 1:
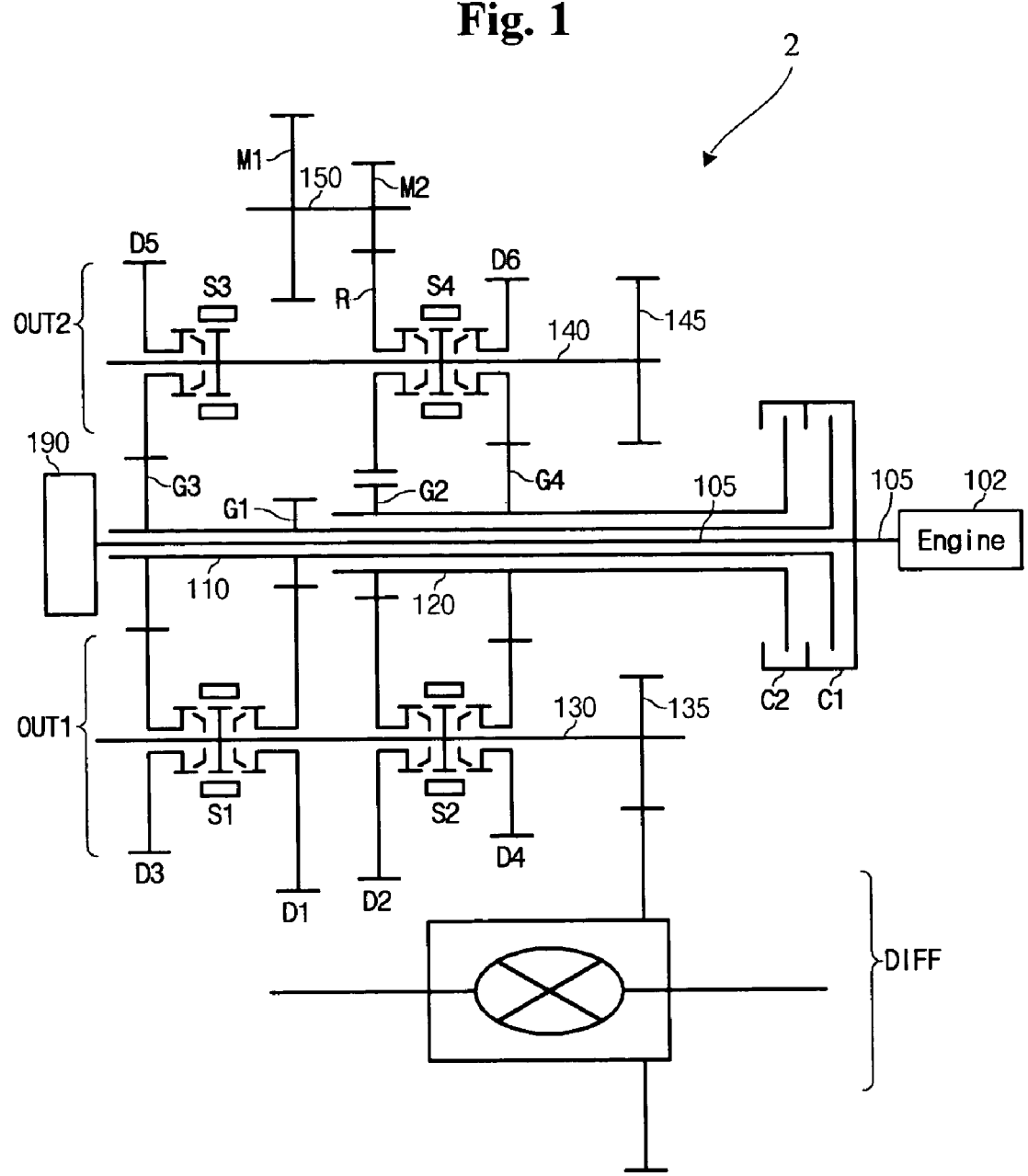
FIG. 1 is a schematic diagram of a double clutch transmission according to an embodiment of the present invention.

According to FIG. 1, a double clutch transmission 2 includes a main input shaft 105; first and second input shafts 110 and 120; first and second clutches C1 and C2; first, second, third, and fourth drive gears G1, G2, G3, and G4; first and second output devices OUT1 and OUT2; and a differential gear DIFF. The main input shaft 105 receives a torque from an engine 102. The first input shaft 110 rotates coaxially with the main input shaft 105. FIG. 1 illustrates, by way of example and not limitation, the main input shaft 105 penetrating through the first input shaft 110 and being connected to an oil pump 190, thereby illustrating a wet-type transmission, however, it will be appreciated by one of ordinary skill in the art that the double clutch transmission 2 of the present invention may also be realized in a dry-type transmission. For example, for a dry-type double clutch transmission, the first input shaft 110 may be formed as a rod having no interior space.

The second input shaft 120 rotates coaxially with the main input shaft 105 and along an exterior circumference of the first input shaft 110. The first and second clutches C1 and C2 selectively transmit a torque of the main input shaft 105 to the first and second input shafts 110 and 120. Therefore, the torque of the main input shaft 105 is transmitted to the first input shaft 110 under an operation of the first clutch C1 and to the second input shaft 120 under an operation of the second clutch C2.

The first and third drive gears G1 and G3 are formed on one input shaft among the first and second input shafts 110 and 120. The second and fourth drive gears G2 and G4 are formed on another input shaft (i.e., an input shaft different from the input shaft on which the first and third drive gears G1 and G3 are formed). That is, among the first and second input shafts 110 and 120, the first and third drive gears G1 and G3 are formed on one thereof, and the second and fourth drive gears G2 and G4 are formed on the other thereof. For example, FIG. 1 illustrates the first and third drive gears G1 and G3, respectively, formed on the first input shaft 110 while the second and fourth drive gears G2 and G4, respectively, are formed on the second input shaft 120.

In further detail, the first and third drive gears G1 and G3 are disposed on the first input shaft 110 such that the second input shaft 120 is closer to the first drive gear G1 than to the third drive gear G3. In addition, the second and fourth drive gears G2 and G4 are disposed on the second input shaft 120 such that the first input shaft 110 is closer to the second drive gear G2 than to the fourth drive gear G4. Regarding disposition of such drive gears, referring to FIG. 1, the first, second, third, and fourth drive gears G1, G2, G3, and G4 are disposed in a sequence of the third drive gear G3, the first drive gear G1, the second drive gear G2, and the fourth drive gear G4, respectively from distal to the engine 102 toward a position proximal to the engine 102.

Diameters of the first, second, third, and fourth drive gears G1, G2, G3, and G4 increase in an order of the first drive gear G1, the second drive gear G2, the third drive gear G3, and the fourth drive gear G4. Therefore, the first, second, third, and fourth drive gears G1, G2, G3, and G4 may be used for realizing four consecutive speeds of first, second, third, and fourth speeds of the transmission.

As shown in FIG. 1, a double clutch transmission 2 further includes a first output device OUT1 and a second output device OUT2. The first output device OUT1 selectively changes torques of the first, second, third, and fourth drive gears G1, G2, G3, and G4, and outputs the changed torque. The second output device OUT2 selectively changes torques of the first, second, third, and fourth drive gears G1, G2, G3, and G4, and outputs the changed torque. A differential gear DIFF is commonly connected to the first output device OUT1 and the second output device OUT2.

Also as shown in FIG. 1, the first output device OUT1 includes a first output shaft 130; first, second, third, and fourth driven gears D1, D2, D3, and D4; and first and second synchronizing devices S1 and S2. The first output shaft 130 is disposed apart from the main input shaft 105 by a predetermined distance. The first, second, third, and fourth driven gears D1, D2, D3, and D4 are disposed on the first output shaft 130, and they are respectively engaged with the first, second, third, and fourth drive gears G1, G2, G3, and G4.

The first synchronizing device S1 selectively transmits one of torques of the first and third driven gears D1 and D3 to the first output shaft 130. The second synchronizing device S2 selectively transmits one of torques of the second and fourth driven gears D2 and D4 to the first output shaft 130. In addition, the differential gear DIFF is connected to a first output gear 135 of the first output shaft 130.

The second output device OUT2 includes a second output shaft 140, fifth and sixth driven gears D5 and D6, first and second mediating gears M1 and M2, a reverse driven gear R, and third and fourth synchronizing devices S3 and S4. The second output shaft is disposed apart from the main input shaft 105 by a second predetermined distance. The fifth and sixth driven gears D5 and D6 are disposed on the second output shaft 140 and respectively engage with the third and fourth drive gears G3 and G4.

The first mediating gear M1 is engaged with the first drive gear G1, and the second mediating gear M2 is connected to the first mediating gear M1 by an idle shaft 150. The reverse driven gear R is disposed between the fifth and sixth driven gears D5 and D6 on the second output shaft 140 and they engage with the second mediating gear M2.

The third synchronizing device S3 selectively transmits a torque of the fifth driven gear D5 to the second output shaft 140. The fourth synchronizing device S4 selectively transmits one of torques of the sixth and reverse driven gears D6 and R to the second output shaft 140. In addition, the differential gear DIFF is connected to a second output gear 145 of the second output shaft 140. Details of the first, second, third, and fourth synchronizing devices S1, S2, S3, and S4 may be obviously realized by a person of ordinary skill in the art, referring to synchronizing devices of a conventional manual transmission, therefore, further discussion of the detail of these structures is not necessary.

An embodiment of the present invention may further include first, second, third, and fourth actuators, respectively, for actuating the first, second, third, and fourth synchronizing devices S1, S2, S3, and S4 to the left and right in FIG. 1. In this case, the first, second, third, and fourth actuators may be driven by a controller.

FIG. 1 does not illustrate a connection between the first mediating gear M1 and the first drive gear G1, and a connection between the second output shaft 140 and the differential gear DIFF. This is because the first and second input shafts 110 and 120, first and second output shafts 130 and 140, idle shaft 150, and differential gear DIFF are planarly drawn for illustrational convenience, although they are spatially disposed. Such a spatial disposition of the first and second input shafts 110 and 120, first and second output shafts 130 and 140, idle shaft 150, and differential gear DIFF appears in FIG. 2.

Figure 2:
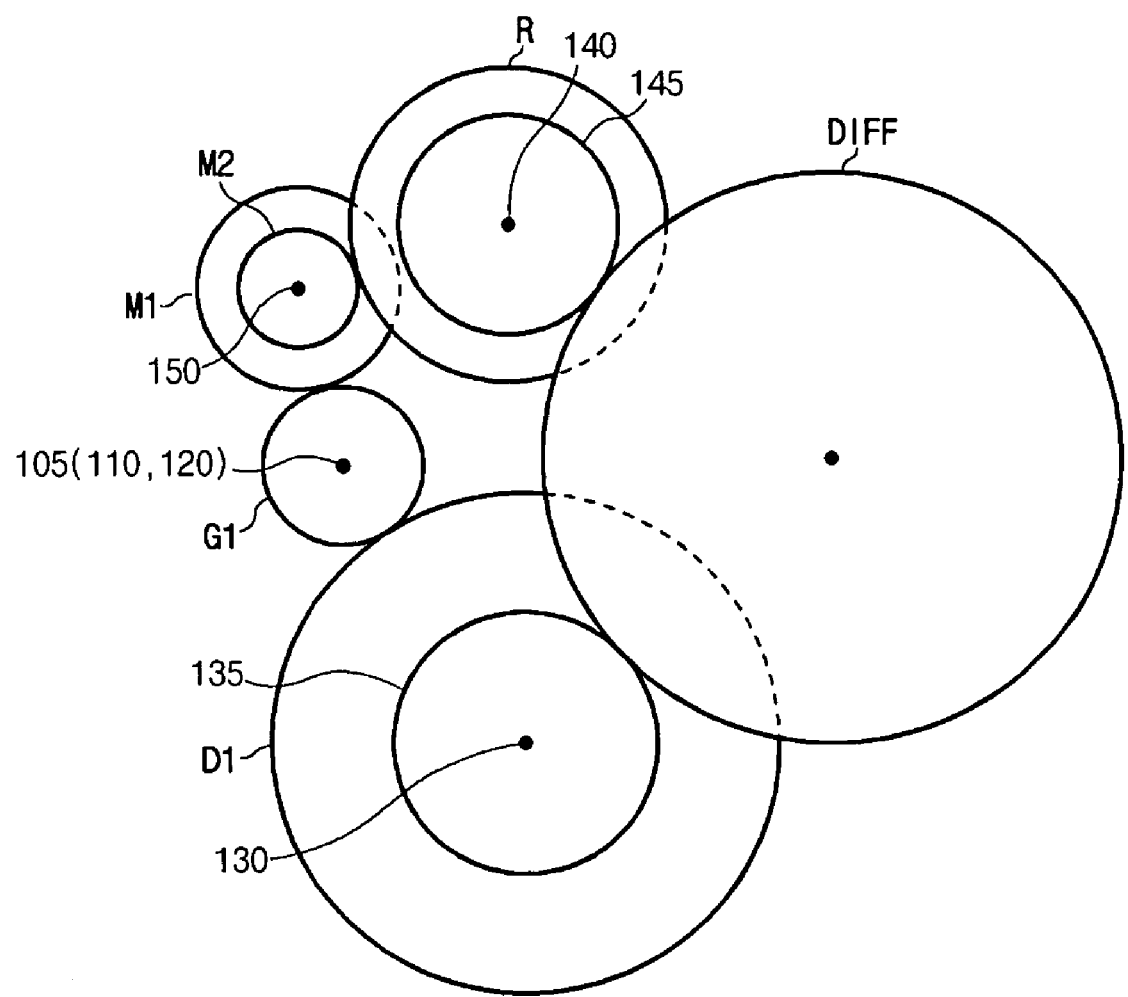
FIG. 2 illustrates a spatial relationship of an idle shaft for a reverse speed, a differential gear, first and second input shafts, and first and second output shafts of a double clutch transmission according to an embodiment of the present invention.

Referring now to FIG. 2, a spatial relationship of an idle shaft 150 for a reverse speed, a differential gear DIFF, first and second input shafts 110 and 120, and first and second output shafts 130 and 140 of a double clutch transmission 2 are illustrated. FIG. 2 is a view of FIG. 1 seen from the right thereof, and some gears shown in FIG. 1 are intentionally not shown in FIG. 2 for better understanding of the spatial relationship among rotation axes of rotating elements.

As shown in FIG. 2, the first and second output shafts 130 and 140 are disposed apart from the second input shaft 120. The idle shaft 150, for a reverse speed, is disposed at a position at which it may form a triangle together with the first input shaft 110 and the second output shaft 140. The first mediating gear M1 on the idle shaft 150 is engaged with the first drive gear G1 of the first input shaft 110 and the second mediating gear M2 on the idle shaft 150 is engaged with the reverse driven gear R of the second output shaft 140.

The differential gear DIFF is disposed at a position that it may form a triangle together with the first and second output shafts 130 and 140, so that the differential gear DIFF is commonly engaged with the first and second output gears 135 and 145 of the first and second output shafts 130 and 140. According to such structural features of a double clutch transmission, disposition of only four drive gears on input shafts may enable a total of seven speeds, i.e., six forward speeds and one reverse speed. Therefore, a length of a forward six-speed double clutch transmission may be substantially shortened. In addition, the shortened length of the idle shaft 150 for a reverse speed contributes to a reduction of rotational inertia of the transmission in forward speeds, an enhancement of torque transmission efficiency in the reverse speed, and durability of the idle shaft 150 for a reverse speed.

Referring back to FIG. 1, shifting operations of such a double clutch transmission according to an embodiment of the present invention are hereinafter described. When the first synchronizing device S1 is driven to the left in FIG. 1 and the first clutch C1 is operated, a torque of the engine 102 is transmitted to the first input shaft 110 such that the first speed is realized.

For shifting to the second speed, firstly, the second driven gear D2 and the first output shaft 130 are synchronously engaged by operating the second synchronizing device S2 to the left in FIG. 1 while the first clutch C1 operates and the second clutch C2 is released. Then, the shifting to the second speed is finished by releasing the first clutch C1 and operating the second clutch C2.

For shifting to the third speed, firstly, the third driven gear D3 and the first output shaft 130 are synchronously engaged by operating the first synchronizing device S1 to the left in FIG. 1 while the first clutch C1 is released and the second clutch C2 operates. Then, the shifting to the third speed is finished by releasing the second clutch C2 and operating the first clutch C1.

For shifting to the fourth speed, firstly, the fourth driven gear D4 and the first output shaft 130 are synchronously engaged by operating the second synchronizing device S2 to the right in FIG. 1 while the first clutch C1 operates and the second clutch C2 is released. Then, the shifting to the fourth speed is finished by releasing the first clutch C1 and operating the second clutch C2.

For shifting to the fifth speed, firstly, the fifth driven gear D5 and the second output shaft 140 are synchronously engaged by operating the third synchronizing device S3 to the left in FIG. 1 while the first clutch C1 is released and the second clutch C2 operates. Then, the shifting to the fifth speed is finished by releasing the second clutch C2 and operating the first clutch C1.

For shifting to the sixth speed, firstly, the sixth driven gear D6 and the second output shaft 140 are synchronously engaged by operating the fourth synchronizing device S4 to the right in FIG. 1 while the first clutch C1 operates and the second clutch C2 is released. Then, the shifting to the sixth speed is finished by releasing the first clutch C1 and operating the second clutch C2.

For shifting to the reverse speed, firstly, the reverse driven gear R and the second output shaft 140 are synchronously engaged by operating the fourth synchronizing device S4 to the left in FIG. 1 while the first clutch C1 is released and the second clutch C2 operates. Then, the shifting to the reverse speed is finished by releasing the second clutch C2 and operating the first clutch C1.

As can be seen from the above shifting process, a clutch required to be operated for realization of adjacent speeds alternately changes. In addition, adjacent speeds require different synchronizing devices to be operated. Therefore, a release of a current speed and a realization of a target speed may be independently controlled during shifting from and to adjacent speeds. In addition, during shifting to an adjacent speed, various manipulation techniques that a driver may perform on a manual transmission, e.g., a half-clutch operation, may be realized by controlling engagement timing of an on-coming clutch and release timing of an off-going clutch.

According to an embodiment of the present invention, disposition of only four drive gears on input shafts may enable a total of seven speeds, i.e., six forward speeds and one reverse speed. Therefore, a length of a forward six-speed double clutch transmission may be substantially shortened. Therefore, the number of gears required for realization of six forward speeds is reduced. Accordingly, a transmission may be more light-weight and a manufacturing process of a transmission may be simplified. In addition, a length of the idle shaft 150 for a reverse speed may be substantially shortened, and accordingly a transmission may be made to be further lighter. It also contributes to a reduction of a rotational inertia of the idle shaft 150, and an enhancement of torque transmission efficiency. Additionally, for shifting to an adjacent speed, one of the first and second clutches is released and the other thereof is operated. Therefore, unceasing power transmission of a transmission may be achieved by controlling the two clutches. Furthermore, a release of a current speed and a realization of a target speed may be independently controlled during shifting from and to adjacent speeds, since adjacent speeds require different synchronizing devices to be operated.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:
1. A double clutch transmission comprising:
a main input shaft for receiving an engine torque;
a first input shaft rotating coaxially with the main input shaft;

a second input shaft rotating coaxially with the main input shaft and along an exterior circumference of the first input shaft;

first and second clutches for selectively transmitting a torque of the main input shaft to the first and second input shafts;

first and third drive gears formed on one input shaft among the first and second input shafts;

second and fourth drive gears formed on another input shaft among the first and second input shafts, said another input shaft being different from said one input shaft;

a first output device for selectively changing torques of the first, second, third, and fourth drive gears and for outputting the changed torque;

a second output device for selectively changing torques of the first, second, third, and fourth drive gears and for outputting the changed torque; and a differential gear commonly connected to the first output device and the second output device.

2. The double clutch transmission of claim 1, wherein the first output device comprises:

a first output shaft disposed apart from the main input shaft by a predetermined distance;

first, second, third, and fourth driven gears disposed on the first output shaft and respectively engaged with the first, second, third, and fourth drive gears;

a first synchronizing device for selectively transmitting one of torques of the first and third driven gears to the first output shaft; and a second synchronizing device for selectively transmitting one of torques of the second and fourth driven gears to the first output shaft, wherein the differential gear is connected to the first output shaft.

3. The double clutch transmission of claim 2, wherein the second output device comprises:

a second output shaft disposed apart from the main input shaft by a second predetermined distance;

fifth and sixth driven gears disposed on the second output shaft and respectively engaged with the third and fourth drive gears;

a first mediating gear engaged with the first drive gear;

a second mediating gear connected to the first mediating gear by an idle shaft; a reverse driven gear disposed between the fifth and sixth driven gears on the second output shaft and engaged with the second mediating gear;

a third synchronizing device for selectively transmitting a torque of the fifth driven gear to the second output shaft; and a fourth synchronizing device for selectively transmitting one of torques of the sixth and reverse driven gears to the second output shaft, wherein the differential gear is connected to the second output shaft.

4. The double clutch transmission of claim 3, wherein diameters of the first, second, third, and fourth drive gears increase in an order of the first drive gear, the second drive gear, the third drive gear, and the fourth drive gear.

5. The double clutch transmission of claim 4, wherein the first, second, third, and fourth drive gears are disposed in a sequence of the third drive gear, the first drive gear, the second drive gear, and the fourth drive gear, respectively, distal to proximal in relation to placement of an engine.

6. The double clutch transmission of claim 4, wherein:

the first and third drive gears are formed on the first input shaft; and the second and fourth drive gears are formed on the second input shaft.

7. The double clutch transmission of claim 6, wherein the first and third drive gears are disposed on the first input shaft such that the second input shaft is closer to the first drive gear than to the third drive gear.

8. The double clutch transmission of claim 6, wherein the second and fourth drive gears are disposed on the second input shaft such that the first input shaft is closer to the second drive gear than to the fourth drive gear.

9. The double clutch transmission of claim 7, wherein the second and fourth drive gears are disposed on the second input shaft such that the first input shaft is closer to the second drive gear than to the fourth drive gear.

10. A double clutch transmission comprising:

a main input shaft configured to receiving an engine torque;

a first input shaft coaxially rotatable with the main input shaft;

a second input shaft coaxially rotatable with the main input shaft and along an exterior circumference of the first input shaft;

first and second clutches for selectively transmitting a torque of the main input shaft to the first and second input shafts;

first and third drive gears coupled with one of said first and second input shafts;

second and fourth drive gears coupled with one of said first and second input shafts but not said input shaft coupled with said first and third drive gears;

a first output device for selectively changing and outputting torques of the first, second, third, and fourth drive gears;

a second output device for selectively changing and outputting torques of the first, second, third, and fourth drive gears; and a differential gear coupled with the first output device and the second output device.

\* \* \* \* \*